US010998819B2

(12) United States Patent
Ahmed et al.

(10) Patent No.: US 10,998,819 B2
(45) Date of Patent: May 4, 2021

(54) METHOD AND SYSTEM FOR DC VOLTAGE CONVERTING

(71) Applicant: University of Plymouth, Plymouth (GB)

(72) Inventors: Mohammed Ahmed, Wembury (GB); Ali Al-Omari, Plymouth (GB)

(73) Assignee: University of Plymouth, Plymouth (GB)

( * ) Notice: Subject to any disclaimer, the term of this patent is extended or adjusted under 35 U.S.C. 154(b) by 0 days.

(21) Appl. No.: 15/543,345

(22) PCT Filed: Jan. 13, 2016

(86) PCT No.: PCT/GB2016/050073
§ 371 (c)(1),
(2) Date: Jul. 13, 2017

(87) PCT Pub. No.: WO2016/113559
PCT Pub. Date: Jul. 21, 2016

(65) Prior Publication Data
US 2017/0373601 A1 Dec. 28, 2017

(30) Foreign Application Priority Data

Jan. 14, 2015 (GB) .................................... 1500549
Jul. 16, 2015 (GB) .................................... 1512420

(51) Int. Cl.
*H02M 3/158* (2006.01)
*H02M 3/155* (2006.01)
*H02M 1/00* (2006.01)
(52) U.S. Cl.
CPC ......... *H02M 3/1582* (2013.01); *H02M 3/155* (2013.01); *H02M 3/1584* (2013.01);
(Continued)

(58) Field of Classification Search
CPC ............ H02M 3/00; H02M 3/02; H02M 3/04; H02M 3/10; H02M 3/145; H02M 3/155;
(Continued)

(56) References Cited

U.S. PATENT DOCUMENTS 6,239,584 B1 * 5/2001 Jang ..................... H02M 3/158
323/222
6,429,629 B1 8/2002 Nguyen
(Continued)

OTHER PUBLICATIONS

Great Britain Search Report for GB1500549.9 dated Jul. 31, 2015.
(Continued)

*Primary Examiner* — Thienvu V Tran
*Assistant Examiner* — Carlos O Rivera-Perez
(74) *Attorney, Agent, or Firm* — Andrus Intellectual Property Law, LLP

(57) ABSTRACT

A DC-DC conversion scheme is described that includes a buck converter including a first switch connected in series with a first inductor, the first switch and first inductor providing a switched connected between an input and an output, a second switch being connected across output, and a DC boost arrangement connected between the first switch and the first inductor, the DC boost arrangement including second and third magnetically linked inductors, the second inductor being connected in series between the first switch and the first inductor, and the third inductor being electrically connected to a point intermediate the first and second inductors, the windings of the second and third inductors being such that a change in current flowing through the second inductor induces a boost current in the third inductor supplementing the current flowing through the second inductor.

12 Claims, 4 Drawing Sheets

(52) U.S. Cl.
CPC ............ *H02M 2001/007* (2013.01); *H02M 2001/0064* (2013.01); *H02M 2003/1552* (2013.01)

(58) Field of Classification Search
CPC ............ H02M 3/1552; H02M 3/1555; H02M 3/1557; H02M 3/156; H02M 3/1563; H02M 3/157; H02M 3/158; H02M 3/1582; H02M 3/1584; H02M 3/1588; H02M 2001/0054; H02M 2001/0064; H02M 2003/1586; H02M 1/08; H02M 1/083; H02M 2001/0067; H02M 2001/00; H02M 2003/1552; H02M 2003/1555; H02M 2001/007; Y02B 70/10; Y02B 70/14; Y02B 70/1458; Y02B 70/1466
USPC ........ 323/205–211, 222–226, 232, 235, 247, 323/255, 257, 259, 266, 271–275, 323/282–285, 351, 906; 363/65, 123–127
See application file for complete search history.

(56) References Cited

U.S. PATENT DOCUMENTS

| | | | |
|---|---|---|---|
| 6,486,642 B1* | 11/2002 | Qian | H02M 3/158 323/255 |
| 6,897,641 B1 | 5/2005 | Herbert | |
| 8,035,361 B2* | 10/2011 | Duan | H02M 3/1584 323/272 |
| 8,716,991 B1 | 5/2014 | Ikriannikov | |
| 2002/0097589 A1* | 7/2002 | Jansen | H02M 3/33592 363/21.14 |
| 2010/0277141 A1 | 11/2010 | Sutardja | |
| 2012/0250363 A1* | 10/2012 | Skinner | H02M 3/1584 363/21.12 |

OTHER PUBLICATIONS

De Brito, Francisco et al.: Comparative analysis of three dc-dc non-isolated buck converters. Industry Applications (Induscon), 2012 10th IEEE/IAS International Conference; Nov. 5, 2012; pp. 1-8.

Rong-Tai, Chen: Single-Stage Autotransformer-Based VRM with Input Current Shaper. IEEE Transactions on Power Electronics, Institute of Electrical and Electronics Engineers, USA; Nov. 1, 2007; pp. 2375-2385; vol. 22, No. 6.

Mira, Maria C. et al.: Analysis and comparison of magnetic structures in a tapped boost converter for LED applications. 2014 International Power Electronics and Application Converence and Exposition, IEEE; Nov. 5, 2014; pp. 594-599.

International Search Report and Written Opinion for International Patent Application No. PCT/GB216/050073 dated Mar. 23, 2016.

* cited by examiner

METHOD AND SYSTEM FOR DC VOLTAGE CONVERTING

CROSS-REFERENCE TO RELATED APPLICATIONS

This application is the U.S. national stage application of International Application PCT/GB2016/050073, filed Jan. 13, 2016, which international application was published on Jul. 21, 2016, as International Publication WO 2016/113559 in the English language. The International Application claims priority of United Kingdom Patent Application 1500549.9, filed Jan. 14, 2015 and United Kingdom Patent Application 1512420.9 filed Jul. 16, 2015.

BACKGROUND

SUMMARY

This invention relates to a DC-DC conversion scheme, for example to step down an input DC voltage to a desired output DC voltage level, and accordingly step up the output current. A method and apparatus is described for use in the stepping-up or stepping-down of the input DC signal.

A number of DC-DC conversion schemes are known. They are typically used in power supplies, controlling the output voltages supplied to, for example, computers or other electronic equipment such as televisions and audio equipment, variable speed motors, electrically powered vehicles and the like. Another application in which it may be desired to provide such a scheme is in controlling the supply to an electrical power supply or distribution network or grid from an electrical generator, for example from a photovoltaic based electrical generation scheme.

One form of DC-DC conversion scheme comprises a linear regulator. An alternative scheme involves the use of a so-called Buck converter. The use of a Buck converter is advantageous compared to the use of a linear regulator in that less energy is lost as heat. FIG. 1 illustrates a simple form of Buck converter. The Buck converter shown in FIG. 1 comprises an inductor 1 and switch 2 provided in series between a supply 3 and a load 5. A second switch, in this case in the form of a diode 4, is connected across the load 5. In use, starting from a condition in which the switch 2 is open, no current will be flowing through the inductor 1 and to the load 5. If the switch 2 is subsequently closed, then the current flowing through the inductor 1 and to the load 5 will rise. The inductor 1 will produce an emf opposing the increase in current, and energy will be stored within the inductor 1. The voltage across the load 5 will be correspondingly lower than the supply. Subsequent opening of the switch 2 will interrupt the connection between the supply 3 and the load 5, and will also result in discharge of the energy stored within the inductor 1 through the load 5 and diode 3. By repeatedly opening and closing the switch 2, this cycle can be repeated. The output voltage, ie the voltage across the load 5, in such an arrangement will always be lower than the input voltage from the supply 3. These schemes allow the voltage across the load 5 to be reduced compared to that at the input or supply 3. However, there are situations in which it is desired to provide an increased output compared to the input.

It is an object of the invention to provide a DC-DC conversion scheme of enhanced efficiency compared to the typical Buck conversion scheme outlined hereinbefore.

According to one aspect of the present invention, there is provided a DC-DC conversion scheme comprising a buck converter including a first switch connected in series with a first inductor, the first switch and first inductor providing a switched connected between an input and an output, a second switch being connected across the output, and a DC boost arrangement connected between the first switch and the first inductor, the DC boost arrangement comprising second and third magnetically linked inductors, the second inductor being connected in series between the first switch and the first inductor, and the third inductor being electrically connected to a point intermediate the first and second inductors, the windings of the second and third inductors being such that a change in current flowing through the second inductor induces a boost current in the third inductor supplementing the current flowing through the second inductor.

The second switch conveniently comprises a diode. The second switch may be connected to a point between the first and second inductors. Alternatively, it may be connected to a point between the second inductor and the first switch.

A further switch, for example in the form of a diode, may be connected so as to control the direction of current flow through the third inductor.

With such an arrangement, starting from a condition in which the first switch is open and so no current flows from the input to the first and second inductors, when the first switch is closed, current starts to flow through the first and second inductors to the output. The change in current flow through the second inductor generates a magnetic flux which, by virtue of the magnetic link between the second and third inductors, induces an emf in the third inductor. The winding directions of the second and third inductors are such that the induced emf results in a current being induced in the third inductor, supplementing that flowing through the second inductor.

By repeatedly opening and closing the switch, with the result that the current flowing through the second inductor is substantially continuously changing, it will be appreciated that the effect of the current induced in the third inductor can be significant.

The switching frequency may depend, to some extent, upon the inductances of the first, second and third inductors. It is envisaged that the switching frequency will be greater than 1 kHz, but it will be appreciated that the invention is not restricted in this regard.

An arrangement of this type provides an efficient DC-DC conversion scheme, effectively increasing the magnitude of the current supplied to the first inductor of the buck converter when the first switch is closed, allowing reductions to be made in the magnitude of the inductance of the first inductor.

The inductance of the second inductor is preferably greater than that of the third inductor. Consequently, even where no further switch or diode is provided to control the direction of current flow through the third inductor, the combination of the second and third inductors may present a high impedance to the input.

An additional switch, for example in the form of a diode, may be provided to control the direction of current flow through the second inductor. The provision of such a diode may serve to protect the first switch. It is thought that in relatively low voltage applications, such a switch or diode may not always be required.

In order to provide additional control over the output voltage, an output control circuit may be connected to the output, the output control circuit comprising fourth and fifth inductors electrically connected and magnetically linked to one another, the output being connected to a point intermediate the fourth and fifth inductors, a switched connection being provided between the fourth inductor and ground, and a pair of output diodes connecting the output and the fifth inductor to an output terminal.

In such an arrangement, when the switched connection is closed, a current will flow through the fourth inductor which induces a current in the fifth inductor.

A DC link circuit may be incorporated between the buck converter and the output. The DC link circuit conveniently includes fourth and fifth magnetically linked inductors and a switched connection between the fourth inductor and ground. By appropriate control over the operation of the switch, the magnitude of the voltage at the output may be controlled. It will be appreciated that such an arrangement may be of particular benefit in arrangements in which a controllable output is desired, such as in variable speed drives and the like.

The invention further relates to a method of achieving DC-DC conversion using a DC-DC conversion scheme as outlined hereinbefore, the method comprising the steps of repeatedly opening and closing the first switch such that, when the first switch is closed, a changing current flowing through the second inductor induces a current in the third inductor supplementing that flowing through the second inductor, thereby boosting the current supplied to the Buck converter. The first switch is preferably switched between its open and closed conditions at a switching frequency greater than 1 kHz.

According to another aspect of the invention there is provided a DC-DC conversion scheme comprising a main inductor, a first circuit leg and a second circuit leg, each circuit leg including a primary switch, a secondary switch and a primary inductor, the primary switch and the primary inductor of each leg being connected in series with the main inductor between an input and an output, the secondary switch of each leg providing a switched ground connection, connected to a point intermediate the associated primary switch and the primary inductor of the associated leg, and wherein the primary inductors of the first and second legs are magnetically linked.

Each leg may include a secondary inductor, the secondary inductors being magnetically linked to the primary inductor of each leg, the respective switched ground connections being connected to points intermediate the primary inductor of each leg and the secondary inductor of the associated leg.

An arrangement of this type may be configured to operate as a boost circuit, the voltage at the output being greater than that at the input. In such an arrangement, each primary switch conveniently takes the form of a diode, and each secondary switch conveniently takes the form of a controllable switch, the operation of which may be controlled, for example, by an associated electronic control unit. By way of example, appropriate transistor or transistor-like devices may be used as the secondary switches.

Alternatively, each primary switch may take the form of an appropriately controlled switch device controlled, for example, using an associated electronic control unit, and each secondary switch may take the form of a diode. Such an arrangement may be employed as a buck-like circuit, the output voltage being lower than that at the input.

Whilst reference is made herein to the use of diodes as the first or second switches, it will be appreciated that the invention is not restricted in this regard and other devices or components may be used instead of diodes, if desired.

The invention further relates to a method of operation of a circuit of the type described hereinbefore, wherein during at least certain phases of operation both of the primary switches or both of the secondary switches simultaneously occupy closed conditions.

BRIEF DESCRIPTION OF THE DRAWINGS

The invention will further be described, by way of example, with reference to the accompanying drawings, in which.

DETAILED DESCRIPTION OF THE DRAWINGS

Figure 1:
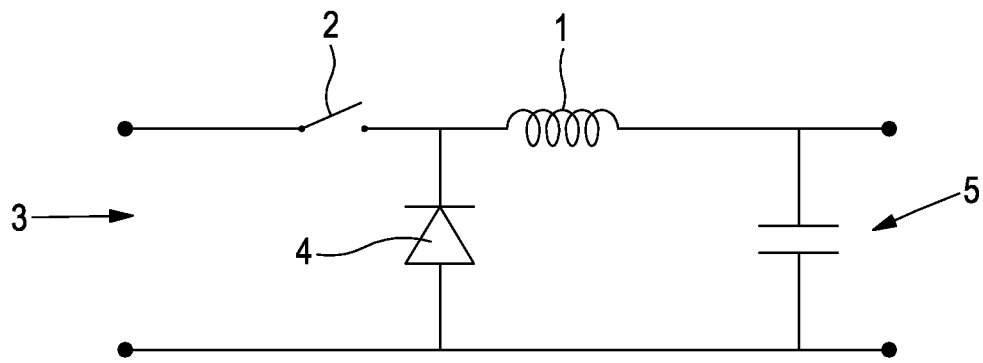
FIG. 1 is a diagrammatic view illustrating a typical Buck conversion scheme, as described hereinbefore.
Figure 2:
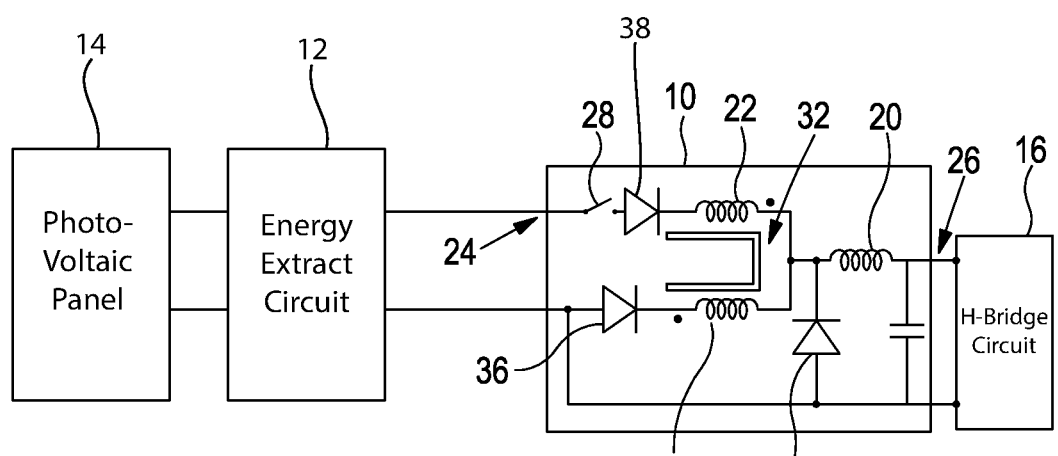
FIG. 2 is a circuit diagram illustrating a DC-DC conversion scheme in accordance with an embodiment of the invention, employed in conversion of the output of a photovoltaic panel energy extraction scheme.

Referring firstly to FIG. 2, a DC-DC conversion scheme 10 is illustrated, the scheme 10 being arranged to convert a varying DC output from an energy extraction scheme 12 associated with a photovoltaic panel 14 for output via an H-Bridge circuit 16 to, for example, an electrical supply or distribution network or grid (not shown).

The scheme 10 comprises a first inductor 20 connected in series to a second inductor 22, the first and second inductors 20, 22 connecting an input 24 connected to the output of the energy extraction scheme 12 to an output 26 connected to an input of the H-Bridge circuit 16. A first switch 28 is located between the input 24 and the second inductor 22. The first and second inductors 20, 22 are interconnected at a connection point to which a third inductor 30 is also connected. The second and third inductors 22, 30 are wound around a common core 32 and so are magnetically linked to one another. As a result, a varying current flowing through the second inductor 22 will, in use, generate a magnetic flux which, in turn, will generate an emf in the third inductor 30 that induces a current therein. The directions in which the second and third inductors 22, 30 are wound is such that the current induced in the third inductor 30 supplements that flowing through the second inductor 22 when the first switch 28 is closed.

As illustrated, a second switch 34 in the form of a diode is connected across the first inductor 20 and output 26. A further switch 36 also in the form of a diode is connected to the third inductor 30 and is operable to control the direction of current flow through the third inductor 30. Whilst switches 34, 36 are illustrated as taking the form of diodes, it will be appreciated that if desired they could be replaced by other devices including appropriately controlled electronic switch devices or the like.

It will be appreciated that the first inductor 20 and first and second switches 28, 34 together form a Buck converter circuit, the second and third magnetically linked inductors 22, 30 together forming a current boost scheme operable to boost the current supplied to the first inductor 20 of the Buck converter circuit, in use.

In use, therefore, starting from a condition in which the first switch 28 is open, it will be appreciated that no current is flowing from the input 24 to the output 26. Subsequent closing of the first switch 28 results in a current starting to flow through the second inductor 22 and first inductor 20 to the output 26. The change in current flowing through the second inductor 22 generates a varying magnetic flux. By virtue of the magnetic linking of the second and third inductors 22, 30 to one another, the generated magnetic flux creates an emf across the third inductor 30. The directions of the windings of the second and third inductors 22, 30 are such that the generated emf results in the further switch 36, in this case in the form of a diode, turning on and in a current being induced, supplementing the current supplied through the second inductor 22 such that the current supplied to the first inductor 20 is increased. Depending upon the level of the generated emf, the diode forming the switch 36 may only partially turn on.

The first inductor 20 forms, as mentioned hereinbefore, part of a Buck converter, the increased current supplied thereto resulting in energy storage therein in the usual manner.

Subsequent reopening of the first switch 28 interrupts the connection of the second inductor 22 to the input 24, and a current is no longer supplied to the first inductor 20 via the second inductor 22. Initially, upon opening of the first switch 28, the diode forming the further switch 36 will continue to conduct. During this phase in the operation of the scheme, as usual with a Buck converter, the first inductor 20 will discharge.

As the current supplied to the first inductor 20, in use, is boosted, it will be appreciated that to achieve a particular effect at the output 26 the inductance of the first inductor 20 may be reduced. As a result, the efficiency of the scheme can be enhanced.

As shown in FIG. 2, an additional diode 38 may be provided, if desired, to protect the first switch 28 from damage or breaking down. It is thought that in relatively low voltage applications this may not be required, but that it may be desirable in higher voltage applications.

Whilst FIG. 2 illustrates the use of the invention in converting the output from a photovoltaic panel to a level suitable for use by an electricity supply or distribution network or grid, it will be appreciated that the invention may be used in a number of other applications. By way of example it may be employed in the power supplies associated with a wide range of electrical or electronic equipment such as computer equipment, televisions and audio equipment. Furthermore, it could be incorporated into the power control systems associated with electric motors such as those used in electrically powered vehicles. It will be appreciated that these are merely examples of applications in which the invention may be utilised, and that the invention is not restricted in this regard.

Figure 4:
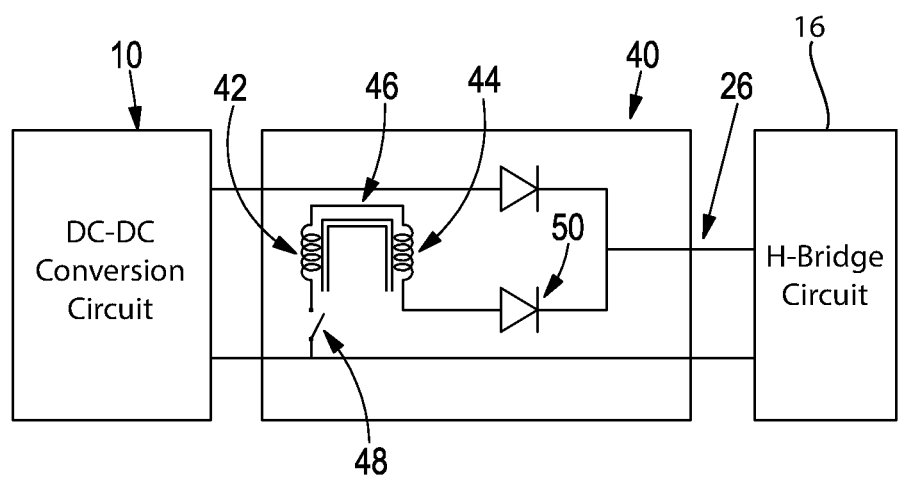
FIG. 4 illustrates a modification.

FIG. 4 illustrates a modification to the circuit of FIG. 2. In the modification of FIG. 4, a DC link circuit 40 is connected between the buck converter formed, in part, by the first inductor 20 and the output 26. The DC link circuit 40 comprises a fourth inductor 42 and a fifth inductor 44, the fourth and fifth inductors 42, 44 being wound upon a common magnetic core and so being magnetically linked to one another. In addition, they are electrically connected to one another at a point 46 connected to the first inductor 20.

The fourth inductor 42 is connected, via a switch 48, to ground, the fifth inductor 44 being connected via a diode 50 to the output 26.

In use, when the switch 48 is open, no current flows to ground via the fourth inductor 42. Upon subsequent opening of the switch 48, current starts to flow through the fourth inductor 42. The change in current flowing through the fourth inductor 42 induces a potential difference across the fifth inductor 44. It will be appreciated that by appropriately controlling the opening and closing of the switch 48, the magnitude of the output voltage at the output 26 can be controlled. The relationship between the voltage at the output 26 and at the input 24 can be expressed as:

$$V\_out/V\_in = D\_1/(1 - D\_2/2)$$

Where Vout and Vin are the voltages at the output 26 and input 24 respectively, and D1 and D2 represent the proportion of time over which the switches 28 and 48, respectively, are closed.

It will be appreciated that the modification shown in FIG. 4 will be of particular benefit in applications in which it is desired to control or vary the magnitude of the output voltage, such as in variable speed drive applications. Another advantage of the arrangement is that the operation of the circuit does not result in the generation of significant harmonics or other effects that require filtration to avoid negatively impacting upon the supply.

Figure 3:
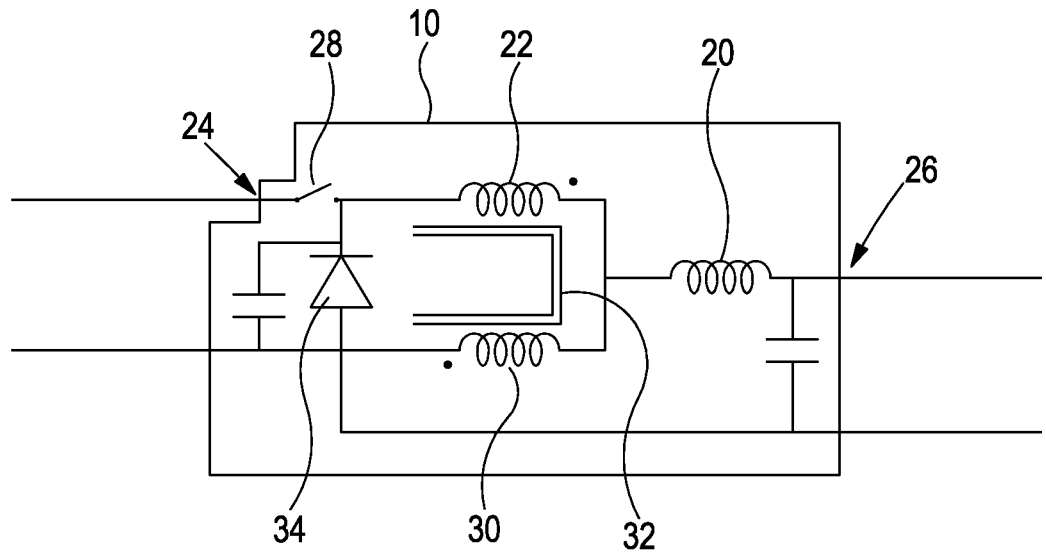
FIG. 3 illustrates a scheme in accordance with an alternative embodiment.

FIG. 3 illustrates a modification to the arrangement shown in FIG. 2 in which the second switch 34, instead of being connected to a point between the first and second inductors 20, 22, is connected to a point between the switch 28 and the second inductor 22. Operation of the arrangement of FIG. 3 is much the same as that of FIG. 2 and so will not be described in further detail. If desired, the DC link circuit of FIG. 4 could be applied to this circuit.

The arrangements described hereinbefore are advantageous in that the circuits are simple and incorporate few components. Manufacture thereof may thus be achieved economically. If desired, the inductors may be of multi-core form.

It is envisaged that the inductors will be of very small size, for example each comprising only a few windings. By way of example, each inductor may have, say 4-6 windings. It will be appreciated, however, that the invention is not restricted in this regard.

Figure 5:
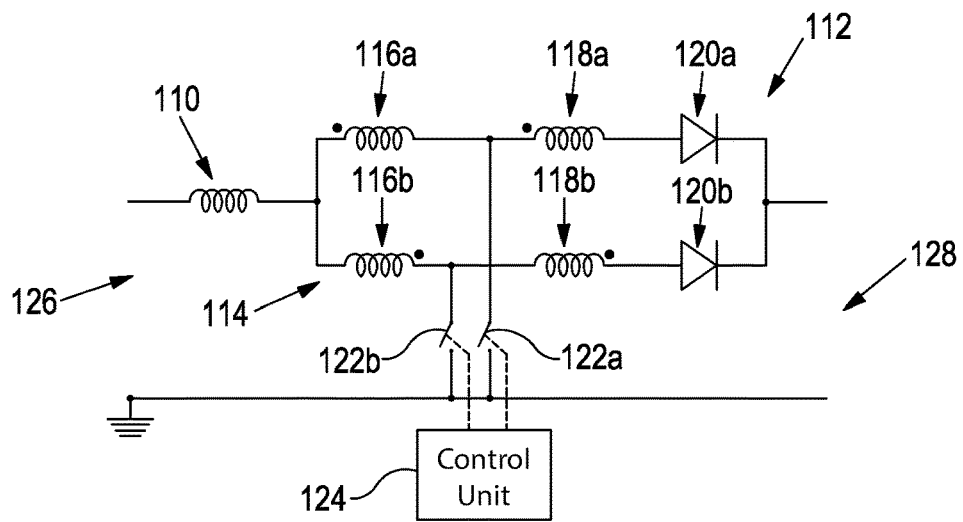
FIG. 5 illustrates another DC-DC conversion circuit in one mode of operation.

Referring next to FIG. 5, a DC-DC conversion circuit is illustrated that comprises a main inductor 110 connected in series with a pair of parallel arms 112, 114, each arm 112, 114 including a primary inductor 116a, 116b, a secondary inductor 118a, 118b, and a primary switch 120a, 120b, all arranged in series with one another, and a secondary switch 122a, 122b providing a switched ground connection to a point intermediate the associated primary inductor 116a, 116b and the primary switch 120a, 120b. In the arrangement illustrated, the primary switches 120a, 120b take the form of diodes, and so switch on and become conductive depending upon the manner in which the circuit is operating. The secondary switches 122a, 122b, whilst illustrated as simple switches will typically take the form of suitably controlled electronic switch devices such as transistors or transistor-like devices. It will be appreciated that a wide range of devices are possible, and the invention is not restricted in this regard. As shown in FIG. 5, a control unit 124 is provided and controls the operation of the secondary switches 122a, 122b.

The primary and secondary inductors 116a, 116b, 118a, 118b of the first and second legs 112, 114 are all wound upon a common magnetic core (not shown) and so are magnetically linked with one another, the winding directions being as illustrated in FIG. 5. The individual inductances of the inductors 116a, 116b, 118a, 118b are very low. By way of example, each inductor may be made up of only a few windings. However, a greater number of windings may be used if desired.

With the circuit connected between an input 126 and an output 128, when both of the secondary switches 122a, 122b are closed (on), the current flowing through the main inductor 110 rises by an amount Δi, inducing an emf in the main inductor 110 opposing the increase in current. From this condition, when one of the secondary switches 122a, 122b is opened (off) and the other is closed (on), the current flowing through the main inductor 110 falls by the amount Δi, the falling current inducing an emf in the main inductor 110 in the opposite direction.

By repeatedly opening and closing the secondary switches 122a, 122b, at all times ensuring that one or other of the secondary switches 122a, 122b is closed (on), there being no times at which both secondary switches 122a, 122b are both open (off), and by appropriate selection of the switching frequency, it will be appreciated that the current flowing through the main inductor 110 may be continuously changing.

The inductances of the primary and secondary inductors 116a, 116b, 118a, 118b are preferably symmetrical in the sense that the inductance of the primary inductors 116a, 116b are equal to one another, and the inductances of the secondary inductors 118a, 118b are equal to one another. As a consequence, the magnitude of the change in current, and the resulting induced emf, will be the same regardless as to which of the secondary switches 122a, 122b is operated at any given time.

Figure 7:
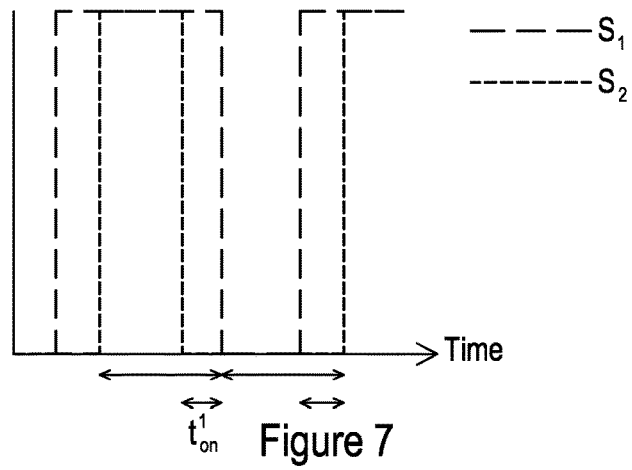
FIG. 7 is a diagram illustrating the operation of the circuit of FIG. 5 in one mode of operation.

When both secondary switches 122a, 122b are closed, the potential at point Vn as illustrated in FIG. 5 is zero, and so $$V\_in = L\_m \Delta i / t\_on$$

where ton is the duration over which both secondary switches 122a, 122b are closed, and using the terminology shown in FIG. 5. FIG. 7 illustrates the changes in the positions of the secondary switches 122a, 122b over time, identifying those periods ton of the period T of the overall switching cycle during which both secondary switches 122a, 122b are closed. It is envisaged that the frequency of the switching cycle will be in the kHz region, but the invention is not restricted in this regard.

When one or other of the secondary switches 122a, 122b is opened (and the other is closed), then Vn is equal to Vα, the potential across the primary inductor 116a, 116b of the leg 112, 114 with which the open secondary switch 122a, 122b is associated, and $$V\_in - V\_\alpha = (-L)\_m \Delta i / (T - t\_on)$$

where T is the period of the switching cycle, as shown in FIG. 7.

Defining a duty cycle D as $$D = t\_on / T$$

the equations set out above can be solved together to produce the transfer function $$V\_out / V\_in = (2 + \eta) 1 / ((1 - D))$$

where $$\eta = \sqrt{(L\_b / L\_a)} = \sqrt{(L\_d / L\_c)}$$

It will be appreciated from the expressions set out above that the ratio of the output voltage to the input voltage can be controlled by control over the duty cycle, ie varying the proportion of time over which both of the secondary switches 122a, 122b occupies its closed (on) position, and/or by the selection of the inductances of the secondary inductors 118a, 118b relative to the primary inductors 116a, 116b.

The circuit illustrated in FIG. 5 may thus serve as a boost circuit, increasing the voltage at the output 128 relative to that at the input 126 by a controllable amount. The circuit is of very high efficiency, minimal losses being experienced, in use.

Whilst FIG. 7 illustrates one possible mode in which the secondary switches 122a, 122b may be controlled, the invention is not restricted in this regard. As noted above, by appropriate control over the duty cycle, the level of boost achieved using the circuit may be controlled. Whilst it is particularly advantageous to operate the circuit in such a manner that there are no periods of time during which both of the switches are open simultaneously, the invention is not restricted in this regard.

Another switching regime that, in some arrangements may be preferred, involves controlling switching such that the secondary switches 122a, 122b are switched at points in the operating cycle at which the potential differences across the switches 122a, 122b being switched is zero. A number of techniques are possible by which such control may be achieved. One possibility is to incorporate an additional sensing winding independent of the primary inductors 116a, 116b, but magnetically associated therewith, such that that the EMF induced in the sensing winding is related to the current flowing within the associated inductors 116a, 116b. By monitoring the EMF induced in the sensing winding, it can be determined when the potential difference across the switches 122a, 122b are zero, and hence when such zero voltage switching should occur.

Figure 6:
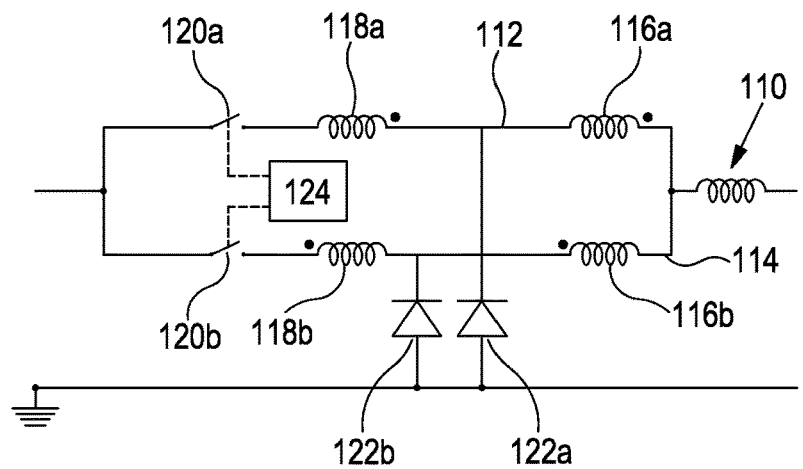
FIG. 6 illustrates a variant of the circuit illustrated in FIG. 5 in another mode of operation.

The circuit of FIG. 5 may be modified or reconfigured slightly to serve as a buck converter rather than a boost converter. FIG. 6 illustrates the circuit when reconfigured in this manner. By comparing FIG. 5 with FIG. 6, it will be appreciated that the reconfiguration of the circuit involves switching the input for the output, replacing the diodes forming the primary switches 120a, 120b with controllable switches, and replacing the switches used as the secondary switches 122a, 122b with diodes.

The circuit of FIG. 6 is operated in substantially the same manner as that of FIG. 5 with the exception that in use the primary switches 120a, 120b, rather than the secondary switches 122a, 122b, are positively controlled. The transfer function of this circuit can be expressed as $$V\_out / V\_in = D + ((1 - D)) / ((2 + \eta))$$

It is clear from the transfer function set out above that the circuit of FIG. 6 includes a buck element (duty cycle D) and an offset related to both the duty cycle and the ratio of the inductor values. As with the circuit of FIG. 5, therefore, the output voltage can be controlled relative to the input voltage either by controlling the duty cycle D, by appropriate control over the operation of the primary switches 120a, 120b, or by control over the relative magnitudes of the inductances used in the first and second legs 112, 114.

Whilst, as with the circuit of FIG. 5, the circuit of FIG. 6 is preferably operated in such a manner that the primary switches 120a, 120b do not both occupy their open positions at the same time, the circuit may be operated in such a manner that this occurs, if desired.

If both the primary switches 120*a*, 120*b* and the secondary switches 122*a*, 122*b* are of a controllable form, then it will be appreciated that a single circuit may be produced that is capable of being used either as a boost converter or as a buck converter, depending upon the manner in which it is connected between the input and output and depending upon the manner in which it is controlled.

As with the arrangement of FIG. 5, the circuit of FIG. 6 is preferably controlled in such a manner that zero voltage switching thereof occurs.

Figure 8:
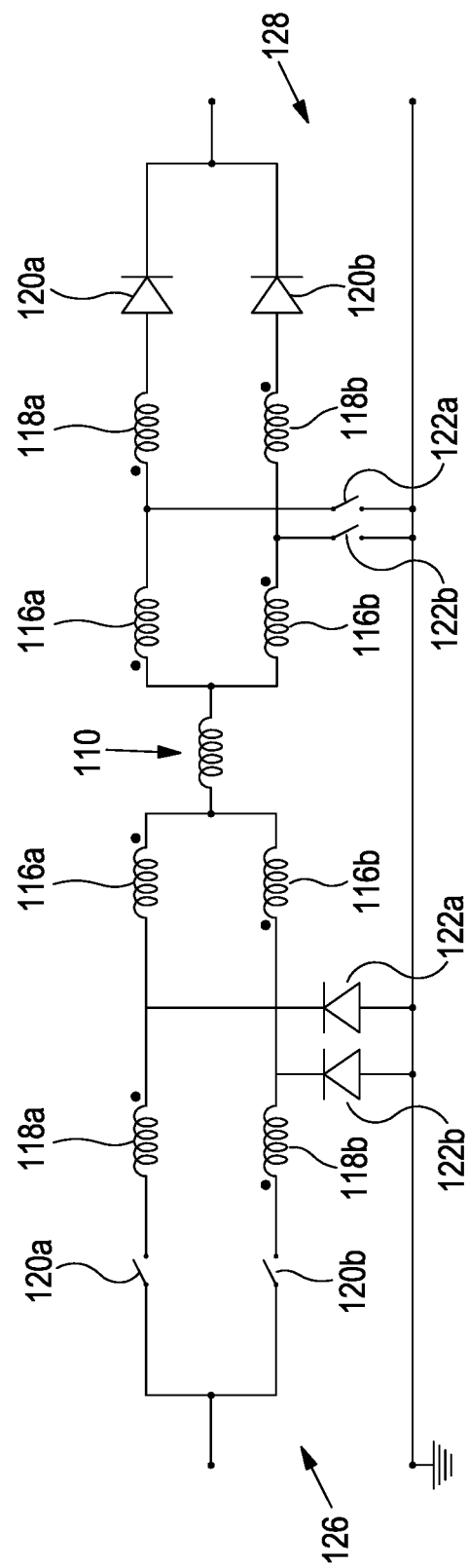
FIG. 8 is a view similar to FIGS. 5 and 6 illustrating another circuit configuration.

FIG. 8 illustrates an arrangement incorporating the buck circuit of FIG. 6 arranged in series with the boost circuit of FIG. 5, the boost and buck circuits sharing a single main inductor 110. It will be appreciated that by appropriate control over the operation of the switches of the circuit of FIG. 8, a universal DC-DC converter scheme is provided, allowing the output signal to be controlled in such a manner as to be high or lower than the input signal. Such a circuit may be used in a wide range of applications including, but not restricted to, applications in which it is desired to maintain the output signal at a constant level despite having a varying input signal.

In the circuits described hereinbefore the inductances of the inductors of the two legs 112, 114 are symmetrically arranged. It will be appreciated that, whilst this is preferred, arrangements may be possible in which this is not the case.

The boost and buck converter circuits of FIGS. 5 and 6 allow the output signal to be increased or decreased relative to that at the input with a high degree of efficiency. The circuits are relatively simple, and so component costs are relatively low.

It will be appreciated that, if desired, the circuits of FIGS. 5, 6 and 8 may be incorporated into circuits of the general form shown in FIGS. 2 and 4.

Whilst the accompanying drawings illustrated specific circuits falling within the scope of the invention, it will be understood that a number of modifications or alternations may be made thereto without departing from the scope of the invention as defined by the appended claims.

The invention claimed is:

1. A DC-DC conversion scheme comprising a main inductor, a first circuit leg and a second circuit leg, each circuit leg including a primary switch, a secondary switch and a primary inductor, the primary switch and the primary inductor of each leg being connected in series with the main inductor between an input and an output, the secondary switch of each leg providing a switched ground connection, connected to a point intermediate the associated primary switch and the primary inductor of the associated leg, and wherein the primary inductors of the first and second legs are magnetically linked, wherein the secondary switches of each circuit leg are controlled so that at no time in the operation of the scheme are both of the secondary switches in an open (off) conditions at the same time such that the current flowing through the main inductor is continuously changing, and that during certain phases in the operation of the circuit both of the secondary switches simultaneously occupy their closed (on) positions, wherein each leg includes a secondary inductor, the secondary inductor of each leg being connected in series between the associated primary inductor and the associated primary switch such that current can flow, in use, through the associated primary and secondary inductors between the input and the output, the secondary inductor of each leg being magnetically linked to associated the primary inductor, the respective switched ground connections being connected to points intermediate the primary inductor of each leg and the secondary inductor of the associated leg.

2. The DC-DC conversion scheme according to claim 1 and configured to operate as a boost circuit, a voltage at the output being greater than that at the input.

3. The DC-DC conversion scheme according to claim 2, wherein each primary switch takes the form of a diode, and each secondary switch takes the form of a controllable switch.

4. The DC-DC conversion scheme according to claim 3, wherein the operation of each controllable switch is controlled by an associated electronic control unit.

5. The DC-DC conversion scheme according to claim 3, wherein each controllable switch comprises a transistor or transistor-like device.

6. The DC-DC conversion scheme according to claim 1 and configured to operate as a buck circuit, a voltage at the output being lower than that at the input.

7. The DC-DC conversion scheme according to claim 6, where each primary switch takes the form of a controllable switch and each secondary switch takes the form of a diode.

8. The DC-DC conversion scheme according to claim 7, wherein the operation of each controllable switch is controlled by an associated electronic control unit.

9. The DC-DC conversion scheme according to claim 7, wherein each controllable switch comprises a transistor or transistor-like device.

10. The DC-DC conversion scheme according to claim 1, wherein switching is configured to occur when a potential difference across the secondary switch of each circuit leg being switched is zero.

11. The DC-DC conversion scheme according to claim 10, wherein a sensing winding is provided for use in determining when the potential difference across the secondary switch of each circuit leg being switched is zero.

12. A method of operation of a circuit of the type comprising a main inductor, a first circuit leg and a second circuit leg, each circuit leg including a primary switch, a secondary switch and a primary inductor, the primary switch and the primary inductor of each leg being connected in series with the main inductor between an input and an output, the secondary switch of each leg providing a switched ground connection, connected to a point intermediate the associated primary switch and the primary inductor of the associated leg, the primary inductors of the first and second legs being magnetically linked, each leg further including a secondary inductor, the secondary inductor of each leg being connected in series between the associated primary inductor and the associated primary switch such that current can flow, in use, through the associated primary and secondary inductors between the input and the output, the secondary inductor of each leg being magnetically linked to the primary inductor of the respective leg, the respective switched ground connections being connected to points intermediate the primary inductor of each leg and the secondary inductor of the associated leg, wherein during certain phases in the operation of the circuit both of the secondary switches simultaneously occupy their closed (on) conditions, and wherein the secondary switches of each circuit leg are controlled so that at no time in the operation of the scheme are both of the secondary switches in an open (off) conditions at the same time such that the current flowing through the main inductor is continuously changing.

* * * * *